Patented Aug. 18, 1931

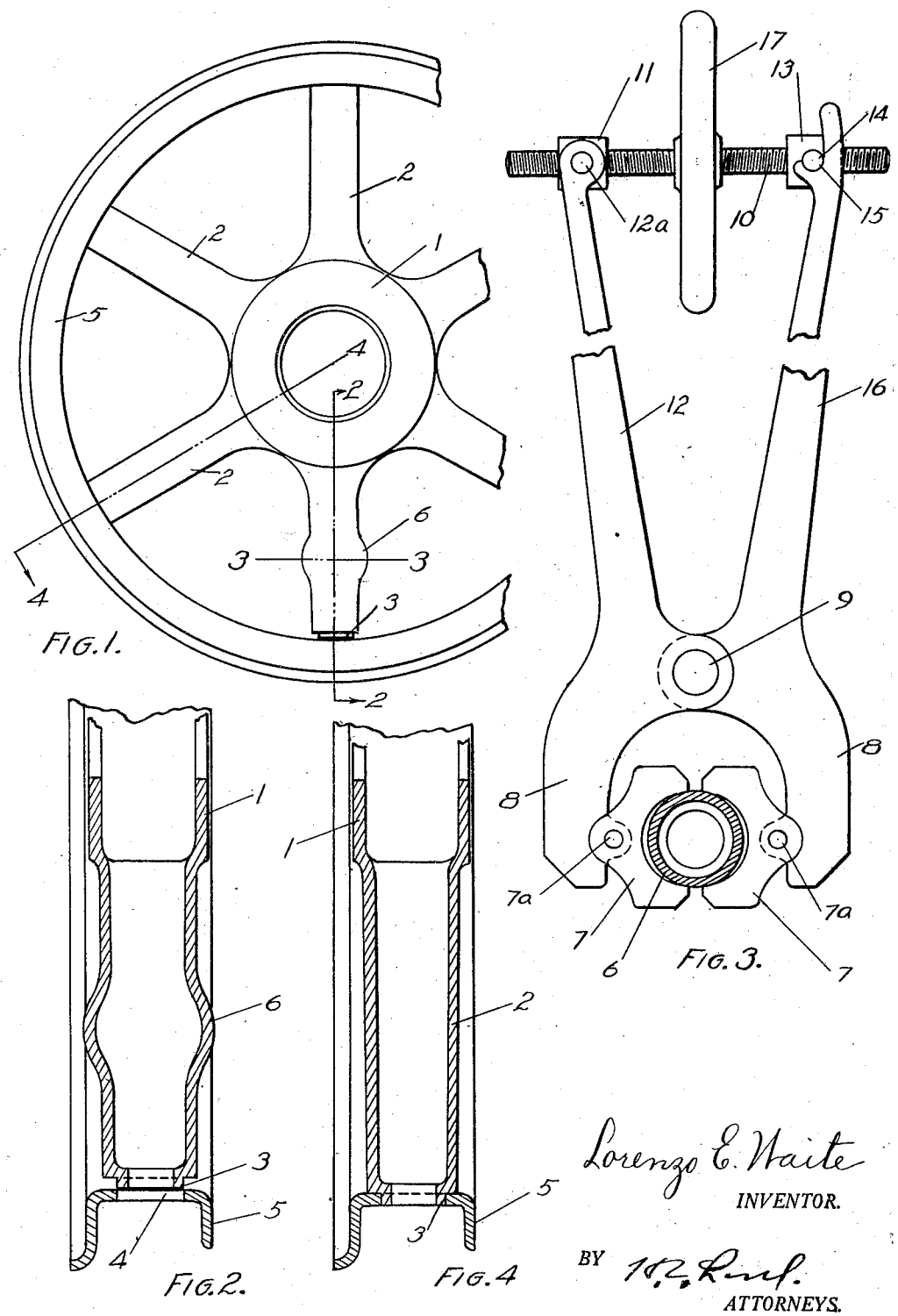

1,819,854

UNITED STATES PATENT OFFICE

LORENZO E. WAITE, OF ERIE, PENNSYLVANIA, ASSIGNOR TO ERIE MALLEABLE IRON COMPANY, OF ERIE, PENNSYLVANIA, A CORPORATION OF PENNSYLVANIA

METHOD OF FORMING METAL WHEELS

Application filed April 7, 1928. Serial No. 268,152.

In the forming of metal wheels it is desirable to form the sections with hollow spokes, preferably integral with the hubs. It is also desirable to provide such a wheel with as light a band as possible. This has been accomplished by supplying the wheel with a rolled steel band. Difficulty has been experienced in properly uniting the band with the ends of the spokes. By means of the present invention a perfect union is formed between metallic spokes and a wheel band, or felloe.

A preferred embodiment of the invention is illustrated in the accompanying drawings wherein is shown a wheel and a method illustrated of forming the same:

Fig. 1 shows a wheel in which some of the spokes have been assembled with the felloe, one spoke being left in its original condition prior to expansion.

Fig. 2 a section on the line 2—2 in Fig. 1.

Fig. 3 a section of a spoke on the line 3—3 in Fig. 1 and showing an instrument for operating on the spoke.

Fig. 4 a section on the line 4—4 in Fig. 1, and showing a finished spoke assembled with the rim.

The wheel center, as shown, is formed with a hub 1 and extending spokes 2. As shown the spokes are integral with the hub and this is the preferable construction. The spokes are provided with tenons 3 at their outer ends.

The tenons 3 are adapted to enter openings 4 in a wheel felloe 5, the wheel felloe being preferably of rolled metal webbed and shaped for strength.

The spokes are cast malleable metal, preferably of malleable iron with bulges 6 in their length. In assembling the wheel, the wheel center is placed within the rim and the bulge 6 is reduced. This reduction results in an elongation of the spoke forcing the tenon 3 into the opening 4 and the end of the spoke into pressed engagement with the inside of the felloe.

The reduction of the bulge may be accomplished in any desirable way. In Fig. 3 I have shown a simple method. This consists of the dies 7 pivoted at 7a on jaws 8 of the operating tool. The jaws are pivoted together at 9. A screw 10 extends through a nut 11. The nut 11 is pivotally secured to a handle 12 extending from one of the jaws by means of a pin 12a. The screw also extends through a nut 13 which has pins 14 extending into seats 15 in a handle 16, the handle 16 opposing the handle 12. A hand wheel 17 is arranged on the screw, which operating on the handles forces the dies 7 inwardly on the bulge. As the dies are forced inwardly the handles are rocked, or oscillated, thus progressively exerting localized pressure on the walls of the bulge. Thus the bulge is ironed out and the bulge portion of the spoke reduced to the same diameter as the walls at the end of the bulge. By making the bulge of proper size exactly the desired elongation may be accomplished in reducing the bulge so that the tenon 3 is forced into the opening 4 and the ends of the spokes pressed against the inner wall of the felloe.

What I claim as new is:—

1. The method of forming metal wheels which consists in forming a wheel center with hollow integral metal spokes, placing said center within a wheel felloe, and elongating the hollow walls of the spokes to assemble the ends of the spokes with the felloe.

2. The method of forming metal wheels which consists in forming a wheel center with hollow spokes, said spokes having bulges in their walls, placing said center within a wheel felloe, and elongating the spokes to assemble the ends of the spokes with the felloe by reducing the bulges in the walls.

3. The method of forming metal wheels which consists in forming a wheel center with hollow spokes, said spokes having bulges in their walls, placing said center within a wheel felloe, and elongating the spokes to assemble the ends of the spokes with the felloe by reducing the bulges in the walls by transverse pressure.

4. The method of forming metal wheels which consists in forming a wheel center with hollow spokes, said spokes having bulges in their walls, placing said center within a wheel felloe, and elongating the spokes to assemble the ends of the spokes with the felloe by reducing the bulges in the walls by transverse pressure progressively applied.

5. The method of forming metal wheels which consists in forming a wheel center with hollow spokes, said spokes having bulges in their walls, placing said center within a wheel felloe, and elongating the spokes to assemble the ends of the spokes with the felloe by reducing the bulges in the walls by transverse pressure progressively and oscillatively applied.

6. The method of forming metal wheels which consists in forming a wheel center with hollow spokes, said spokes having bulges in their walls, placing said center within a wheel felloe, and elongating the spokes to assemble the ends of the spokes with the felloe by reducing the bulges in the walls by pressure progressively applied.

In testimony whereof I have hereunto set my hand.

LORENZO E. WAITE.